May 16, 1961  H. STAUBACH  2,984,167
LENS-FOCUSSING ARRANGEMENT
Filed May 12, 1959  3 Sheets-Sheet 1
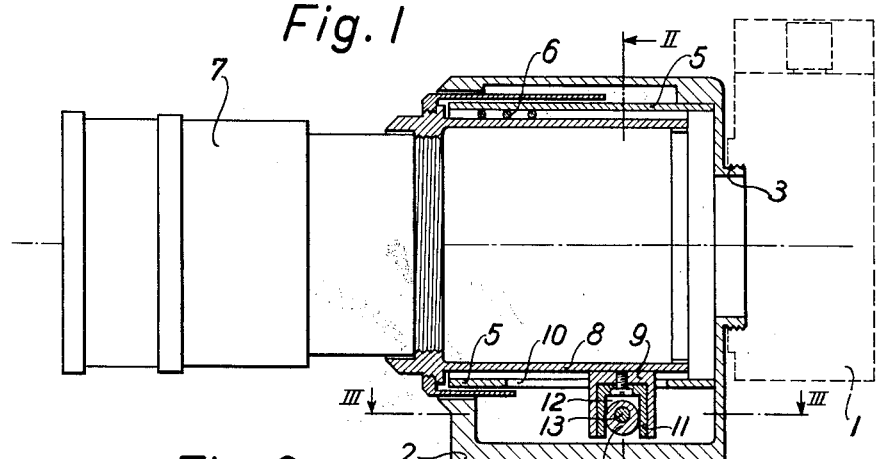
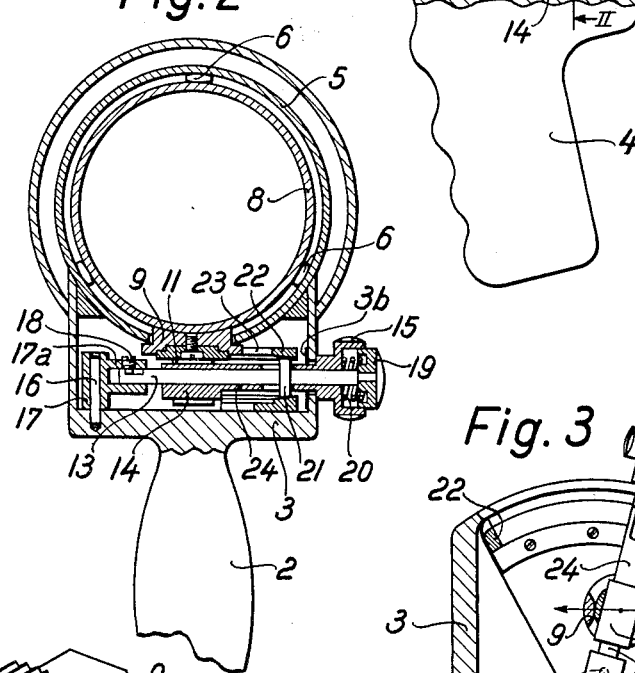
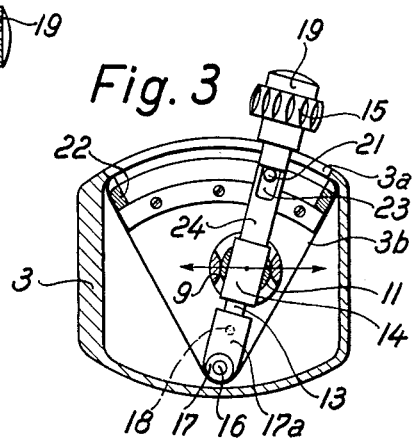
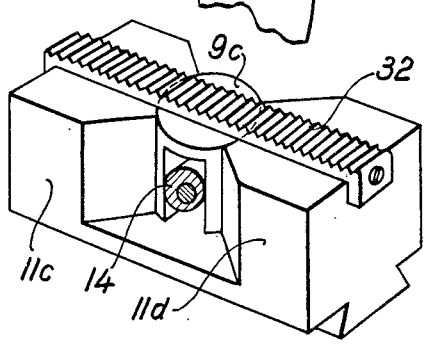
INVENTOR
HEINRICH STAUBACH
BY Toulmin & Toulmin
ATTORNEYS

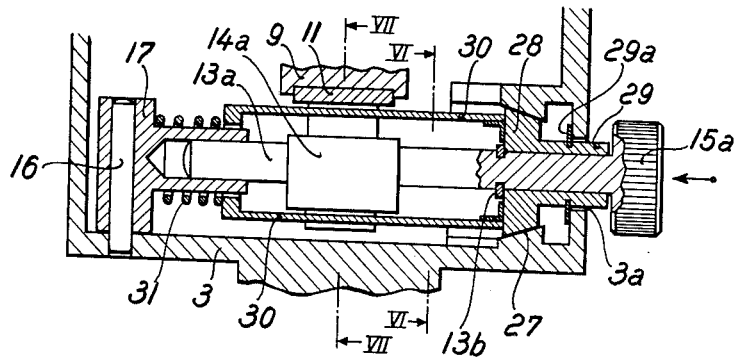
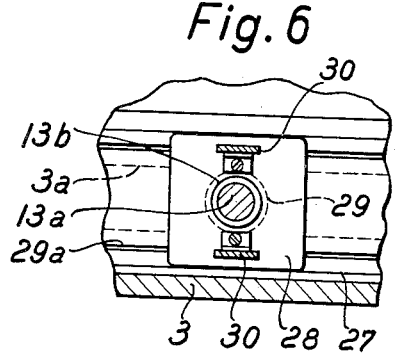
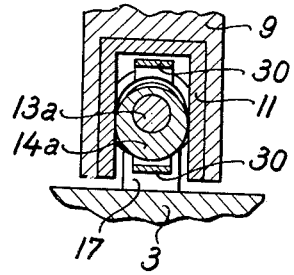
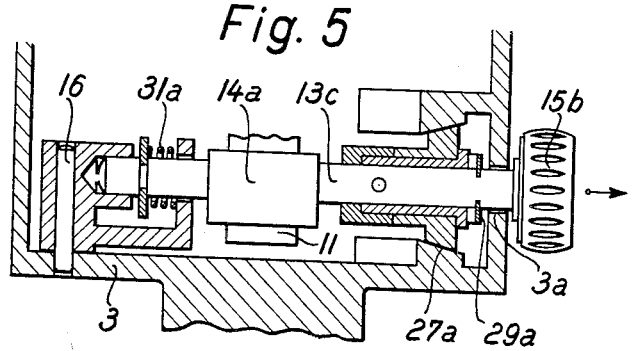

May 16, 1961

H. STAUBACH 2,984,167

LENS-FOCUSSING ARRANGEMENT

Filed May 12, 1959

INVENTOR
HEINRICH STAUBACH
BY Toulmin & Toulmin

ATTORNEYS

United States Patent Office 2,984,167  
Patented May 16, 1961

2,984,167
LENS-FOCUSSING ARRANGEMENT

Heinrich Staubach, Midland, Ontario, Canada, assignor to Ernst Leitz Canada Limited, Optical Works, Midland, Ontario, Canada Filed May 12, 1959, Ser. No. 812,712

Claims priority, application Germany May 24, 1958

7 Claims. (Cl. 95—45)

The present invention relates to a focussing arrangement for photographic lenses, more particularly, to long-range lens on a camera which is slidably mounted for linear movement to adjust for objects located at varying distances from the camera.

It has been previously proposed to use a lever pivotally mounted in a lens attachment to adjust long-range lenses attached to a camera or the like. This type of adjustment has a distinct advantage over the screw adjustment in that the lens can be rapidly focussed between close-up and distant objects.

In order to obtain a favorable power transmission ratio, together with accurate adjustments of the lens, the lever arm of the handle has been made longer than the lever arm connected to the adjustable lens.

This can be readily accomplished in the case of lenses having a relatively short movement corresponding to the range of adjustment of the lens. In the case of lenses with a relatively long movement, however, difficulties arise in that the adjusting lever must be correspondingly lengthened. This is not possible to an unlimited extent for reasons of design and appearance, since the length of the adjusting lever will reach awkward proportions. Therefore, in such arrangements, the ratio of the lever arms chosen does not permit sufficiently fine adjustment for practical purposes. Only by moving the lever back and forth several times beyond the correct position of adjustment can the precisely required position of the lens be achieved. Also, considerable skill by the operator is required to rapidly use such a lever system.

The present invention provides considerable improvement over the above-described lever adjustment in that a fine adjustment is provided in addition to the pivoting lever which provides a rapid means of coarse adjustment. The means for the fine adjustment are combined with the adjusting lever. In one embodiment this is done by providing the lever at its point of connection with the lens with an eccentric with its axis extending parallel to the lever and so made that the lever is capable of movement both about its pivot axis and also about its own axis. The lever may serve as a supporting member for an eccentric rotatable about the lever axis.

The lever can be made in two parts which are in telescoping relation with each other. One of the parts is then pivotable about an axis extending perpendicular to the adjusting lever, whereas the other part is mounted to rotate about its own axis. Instead of this arrangement, however, the lever can be made in one piece and a ball-and-socket joint provided as a pivot and rotary bearing.

In addition, it is proposed according to this invention that the adjusting member for the rough and/or fine adjustment be adjustable in relation to the lens casing by means of a releasable friction holding device.

The adjusting lever can be constructed as a one- or two-armed lever, the connection point with the lens being in the first instance located between the pivot axis and the handle and in the second instance at the end remote from the handle. For reasons of design and appearance, preference is given to the one-armed lever, unless it is desired to coordinate the movement of the lever to correspond with approaching an object or going away from the object. This coordinated movement is also possible with a one-armed lever. In this event, gear means reversing the movement of the lever with respect to the lens is provided.

It is therefore the principal object of this invention to provide a novel and improved focussing arrangement for a photography lens when the lens is mounted for linear movement.

It is another object of this invention to provide a focussing arrangement for a photography lens when the lens is mounted for linear movement, which arrangement has both a coarse and a fine adjustment.

It is a further object of this invention to provide a focussing arrangement for a photography lens, which lens is mounted for linear movement wherein the lens is positioned by moving a pivotally mounted lever.

It is an additional object of this invention to provide a focussing arrangement for a photography lens, which lens is mounted for linear movement wherein the lens is positioned by moving a pivotally mounted lever for coarse adjustment of the lens and wherein structure is provided on said lever for fine adjustment of said lens.

It is still another object of this invention to provide rapid and accurate focussing of a linearly mounted long-range lens by moving a pivotally mounted lever which extends outwardly of the lens casing.

Other objects and advantages of this invention will become apparent upon reference to the accompanying description when taken in conjunction with the following drawings, wherein:

Figure 1 is a longitudinal sectional view of a long-range lens with a lens casing having a handle and adjusting lever for rough and fine adjustment mounted in said casing, the camera being roughly indicated;

Figure 2 is a sectional view on the line II—II of Figure 1;

Figure 3 is a horizontal sectional view on the line III—III of Figure 1;

Figures 4 and 5 are sectional views similar to Figure 2 but showing in enlarged scale the adjusting lever;

Figure 6 is a sectional view on line VI—VI of Figure 4;

Figure 7 is a sectional view on line VII—VII of Figure 4;

Figure 10 is a perspective view of the slide used in the modification disclosed in Figures 8 and 9.

Figure 8:
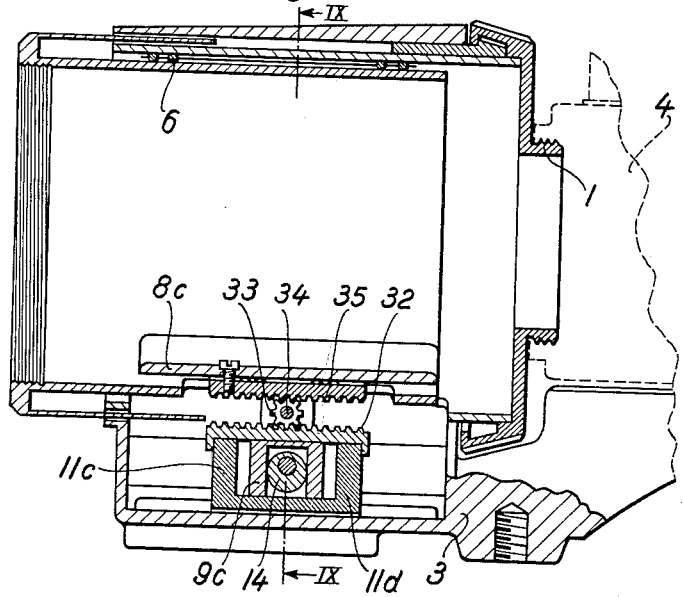
Figure 8 is a longitudinal sectional view of a long-range lens with a one-armed adjusting lever and toothed gear between the lever and the lens for reversing the movement.

Returning now to the drawings, wherein like reference symbols indicate the same parts throughout the various views, a specific embodiment of this invention will be described by initially referring to Figure 1. The camera 1 has attached thereto a lens casing 2 by means of a screw connection 3. There is a handle 4 on the lens casing. The lens casing has a guide sleeve 5 which, in conjunction with roller bearing 6, serves as a support for an attachment in which a lens 7 is mounted.

The attachment 8 has a bifurcated or forked projection 9 which projects through an aperture 10 in the guide sleeve 5 and is constructed as bearing point for a pin 11 rotatable at right-angles to the optical axis of the lens 7 and prevented from dropping out by an abutment screw. The pin 11, like the projection 9, is forked, and has a slot 12 which accommodates an eccentric 14 rotatable on a shaft or bolt 13. This eccentric is adjustable by means of a knurled knob 15 mounted on the bolt 13. One end of the shaft 13 extends into a tubular projection 17a of a connecting member 17 which pivots on a pin 16. The shaft 13 has on its other end a press knob 19 which projects through a slot 3a in the lens casing and is also axially movable and guided for linear motion by means of a groove-and-pin 18. In addition, the shaft 13 is loaded by a spring 20 bearing against the knurled head 15. By exerting pressure on the knob 19, it can be shifted manually against the action of the spring. The swivel member 17, the bolt 13 and the eccentric 14, together with the knurled knob 15, constitute an adjustable lever which can swing about the pin 16. The connection with the lens attachment 8 is formed by the eccentric and the forked elements 9 and 11. A cover strip 3b is positioned over the slot 3a and is movable with the lever.

A pin 21 is mounted on the shaft 13 and projects through an aperture 23 in a sleeve 24 connecting the eccentric 14 with the knurled knob 15. The pin 21 has at its end a sloping surface which, according to the position of the bolt, comes into engagement with a similar surface on a bar 22 on the lens casing 2. The aperture 23 is sufficiently large so that the eccentric can be rotated therein with a certain amount of clearance.

The focussing of the lens is done as follows:

By pushing inwardly the knob 19, the friction holding device 21/22 is released and the adjusting lever, consisting substantially of the members 13, 14 and 17, can now be pivoted. The knurled knob 15 serves as an operating handle. The movement of the lever is transmitted to the lens through the connecting members between the lever and the lens to provide coarse adjustment for the lens.

The eccentric 14, which is mounted on the shaft 13, is not turned during the coarse adjustment. The forked elements 9 and 11 serve as connecting members. After the coarse adjustment has been carried out, the knob 19 is released and the shaft 13 is locked against pivoting movement. The eccentric 14 mounted on this bolt can, however, be turned by the knurled knob 15 for the purpose of fine adjustment. The forked elements 9 and 11, and also the lens, are shifted by the rotation of the eccentric 14 and the knob 15.

In this embodiment, the rotation of the knurled knob is limited. To eliminate this limitation and the press knob 19, the shaft 13a is rotatably mounted in the connecting member 17, as shown in Figure 4. This connecting member is capable of pivoting about the pin 16 as described above. The eccentric 14a in this case is fixed on the shaft 13a and is connected with the guide sleeve 5 through the forked elements 9 and 11 in the same manner as above described (Figure 1). The inclined surfaces designated at 27 can be brought into contact to establish a friction lock with the correspondingly shaped surfaces of a movable part 28. The part 28 is mounted on a sleeve 29 in which the bolt 13a is supported and is secured against movement in relation to the sleeve by means of the disc 13b. There are two arms 30 (Figures 4, 6, 7) extending from the part 28 and acted upon by a spring 31 bearing against an axially non-shiftable part 17. The shaft 13, provided with a knurled knob 15a at its end, projects with the sleeve 29 through a slot 3a in the lens casing. This slot is again covered by a strip 29a fixed on the sleeve.

The adjustment of the lens is accomplished as follows:

By pressing the knurled knob 15a in the direction of the arrow shown in Figure 4, the friction locking device 27/28 is released so that the adjusting lever, comprising the bolt 13a with eccentric 14a and connecting member 17, can be pivoted. The pivoting movement is transmitted by the eccentric 14a through elements 9 and 11 to coarsely adjust the lens attachment.

When the coarse adjustment has been carried out, the knurled knob is released, whereby the adjusting lever is locked by the friction holding device. The shaft 13a and the eccentric 14a fixed thereon are then rotated, and the lens is finely adjusted in the manner above described through the forked elements 9 and 11. The knurled knob is preferably provided with a zero mark the position of which corresponds to the position of the eccentric in which the plane formed by the shaft and major eccentric axis stands perpendicular to the swivel plane. If the knurled knob is set to the zero mark before commencing the coarse adjustment, it is thus possible to carry out the fine adjustment in both directions.

In the example illustrated in Figure 5, the shaft 13c is pressed in the direction towards the pin 16 by means of the spring 31a. The operation of the shaft is done by the knurled knob 15b, which must be pulled out for the coarse adjustment. This will release the friction holding device 27a. The fine adjustment is similar to that in the preceding example.

Figure 9:
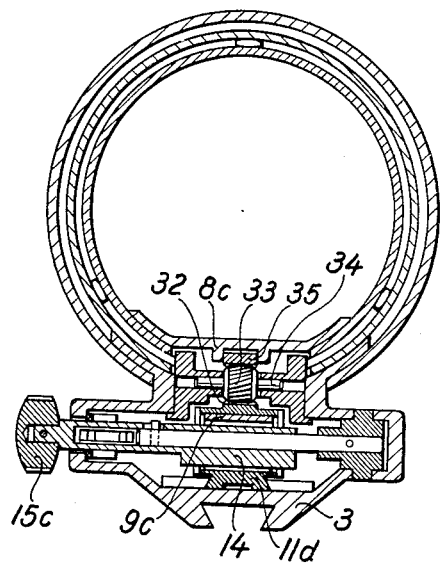
Figure 9 is a sectional view on line IX—IX of Figure 8.

In the modification shown in Figures 8 and 9, which is based substantially on the construction illustrated in Figures 1 to 3, reversal of the direction of movement is provided between the adjusting lever and the lens. For this purpose, the forked part straddling the eccentric is mounted in a slide 11c guided in the carrier 3 by means of a dovetail 11d. On the upper side of the slide there is a toothed rack 32 meshing with a pinion 33 mounted on an axle 34 in the carrier 3. Opposite the toothed rack 32, a second toothed rack 35 is arranged which also meshes with the pinion 33 and is fixed on the attachment part 8c. In this example the lens is not shown, so as to clarify the drawing.

As in the modifications described above, the knurled knob 15c must be actuated for effecting the coarse and fine adjustments. In the case of coarse adjustment, the direction of movement corresponds to approaching an object and going away from the object.

It will be understood that this invention is susceptible to modification in order to adapt it to different usages and conditions, and, accordingly, it is desired to comprehend such modifications within this invention as may fall within the scope of the appended claims.

What is claimed is:

1. A focussing arrangement for a long-range photography lens comprising a casing, a lens slidably mounted in said casing for linear movement thereon, said lens having a forked member thereon within said casing, a lever movably mounted in said casing and operatively connected to said forked member, said lever extending outwardly of said casing so that pivotal movement of said lever would move said forked member and lens therewith for coarse adjustment of said lens, and eccentric means on said lever and within said forked member for moving said forked member and said lens therewith for fine adjustment of said lens, said eccentric means having an axis parallel to the axis of the lever.

2. The focussing arrangement of claim 1, wherein said movable mounting of said lever comprises a ball-and-socket connection whereby said lever is capable of both pivotal movement and rotary movement around its own axis.

3. A focussing arrangement for a long-range photography lens comprising a casing, a lens slidably mounted in said casing for linear movement thereon, a shaft pivotally mounted within said casing and extending outwardly thereof, a tubular member rotatably mounted on said shaft and extending outwardly of said casing so that said shaft and tubular member form a lever, said tubular member having an eccentric thereon, and means operatively connecting said eccentric and said lens so that pivotal movement of said lever will provide coarse adjustment of said lens and rotary movement of said tubular member and said eccentric will provide fine adjustment of said lens.

4. A focussing arrangement for a long-range photography lens comprising a casing, said casing having a sloping surface therein, a lens slidably mounted on said casing for linear movement thereon, a shaft pivotally mounted within said casing and extending outwardly thereof, said pivotal mounting providing axial movement of said shaft, said shaft having a locking element thereon with a sloping surface for engagement with said casing sloping surface, a spring urging said shaft in a direction so as to force said sloping surfaces together to lock said shaft against pivotal movement whereby said locking is released upon moving said shaft in the opposite direction, a tubular member rotatably mounted on said shaft and extending outwardly of said casing so that said shaft and tubular member form a lever, said shaft member having thereon an eccentric having an axis parallel to the axis of the shaft, and means operatively connecting said eccentric and said lens so that pivotal movement of said lever will provide coarse adjustment of said lens and rotary movement of said tubular member and eccentric will provide fine adjustment of said lens, said tubular member being rotatable when said shaft is locked against pivoting movement.

5. A focussing arrangement for a long-range photography lens comprising a casing, a lens slidably mounted in said casing for linear movement thereon, a shaft having a pivotal mounting within said casing with said pivotal mounting permitting rotary movement of said shaft, an eccentric having an axis parallel to said shaft on said shaft, means operatively connecting said eccentric and said lens so that rotary movement of said shaft will provide fine adjustment of said lens and pivoting movement of said shaft will provide coarse adjustment of said lens, a sleeve on said shaft and means on said sleeve for friction locking said shaft against pivoting movement with respect to said casing, said connecting means comprising fork means surrounding said eccentric means.

6. A focussing arrangement for a long-range photography lens comprising a casing, a lens slidably mounted in said casing for linear movement thereon, a rack on said lens, a pinion meshing with said rack, a slide mounted in said casing for linear movement thereon, a second rack on said slide and meshing with said pinion, a forked member mounted on said slide, a shaft pivotally mounted in said casing and passing through said forked member to extend outwardly of said casing, and a tubular member rotatably mounted on said shaft and having an eccentric thereon within said forked member whereby pivoting movement of said shaft will move said slide to coarsely adjust said lens through said rack-and-pinion arrangement and rotational movement of said tubular member will move said slide by means of said forked member to provide fine adjustment of said lens.

7. A focussing arrangement for linearly-guided photographic objective lenses, in particular long-range objective lenses, comprising a casing, a lens slidably mounted in said casing for linear movement thereon, a lever connected to said lens and pivotally mounted in said casing, said lever extending outwardly of said casing so that pivotal movement of said lever provides a coarse adjustment of said lens, and eccentric means having an axis parallel to the axis of the lever attached to said lever, and also operatively connected to said lens, whereby the lever is also rotatable around its own axis for fine adjustment of said lens through said eccentric means.

References Cited in the file of this patent

UNITED STATES PATENTS

| | | |
|---|---|---|
| 2,259,415 | Eddy | Oct. 14, 1941 |
| 2,305,301 | Maniya | Dec. 15, 1942 |